July 11, 1967 R. C. SLAWINSKI ET AL 3,330,299
COUPLING VALVE

Filed Sept. 9, 1964 4 Sheets-Sheet 3

INVENTORS –
Richard C. Slawinski &
BY William Meyer –
Richards and Cifelli,
Attorneys –

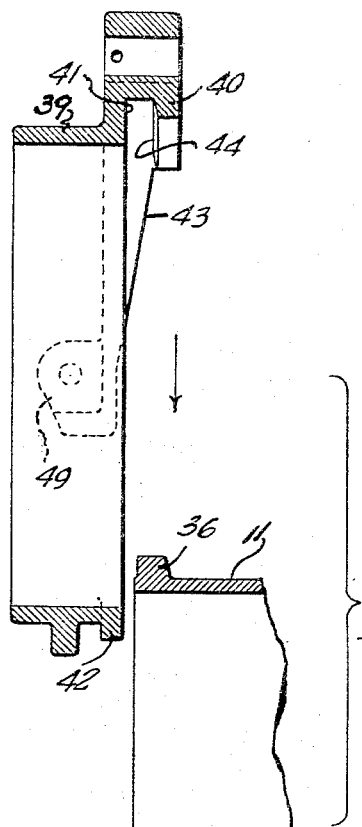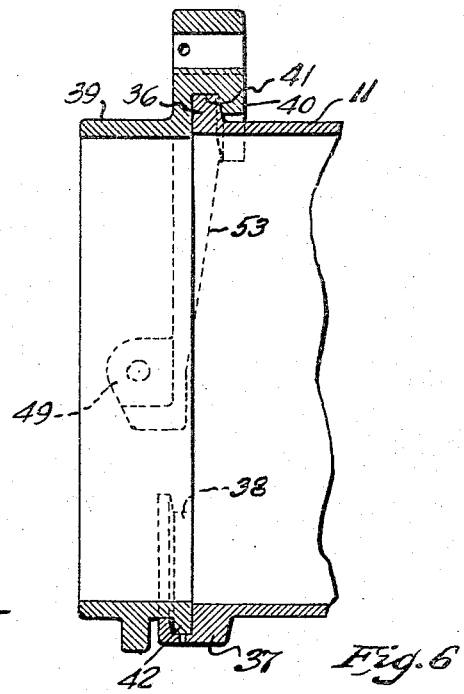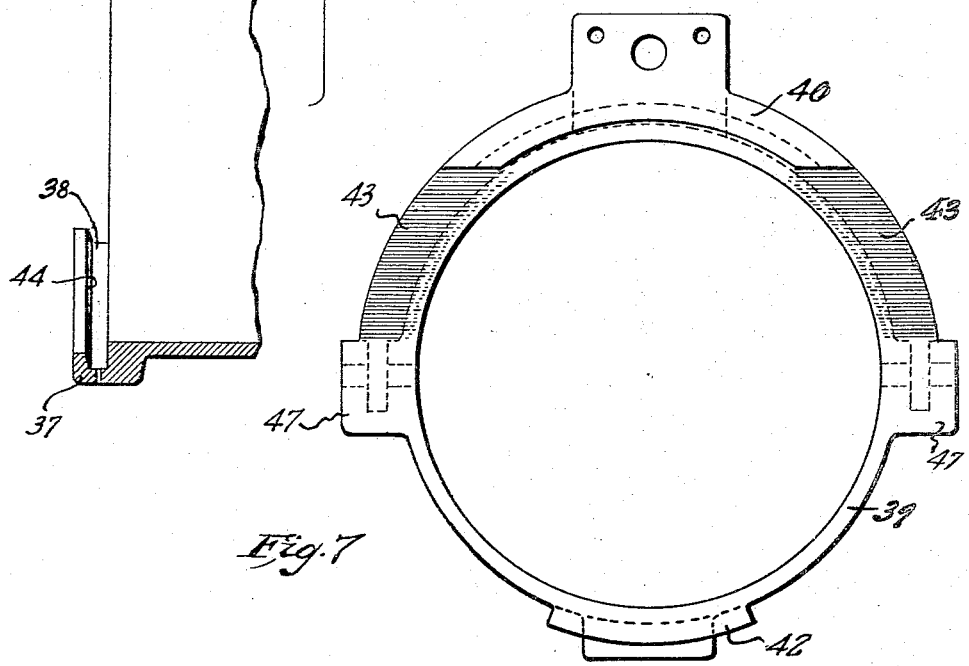

United States Patent Office 3,330,299
Patented July 11, 1967

3,330,299
COUPLING VALVE
Richard C. Slawinski, Murray Hill, and William Meyer, East Orange, N.J., assignors to Wheaton Brass Works, Union, N.J., a corporation of New Jersey
Filed Sept. 9, 1964, Ser. No. 395,128
10 Claims. (Cl. 137—614)

This invention relates to a novel and improved construction of coupling valve which is adapted for use in fluid delivery operations, being especially adapted for bulk handling of gasoline and other petroleum products in the loading of transport truck tanks and the like.

This invention has for an object to provide a novel and improved construction of coupling valve of low first cost and minimum maintenance cost, being easily and quickly manipulatable in the operations of connecting and disconnecting its members, and which is adapted to assure high flow rates at minimum pressure drop when its members are connected, and dry breaks when its members are disconnected.

Another object of this invention is to provide a coupling valve which comprises an adapter or receiving member that is affixed to a tank to be supplied in communication therewith, and a coupler member that is affixed to any suitable type of movable delivery conduit which leads from a source of fluid supply, such, for example, as a swivel jointed loading arm of a bulk storage depot or other supply source; both said receiving member and coupler member having valve means adapted to open for fluid passage when the members are operatively joined together, and to close said members when the same are disconnected one from the other; said members having separable cooperative interlocking elements operative to join the same together in coupled relation; and said coupler member having manually operative means for opening the valve means after the members are joined together in coupled relation.

A further object of this invention is to provide the coupler member with means for conveniently handling the same when connecting and disconnecting it relative to the receiving member; the coupler member being further provided with means operative to quickly guide the same into connected interlocked relation to the receiving member, without risk of scribing or galling meeting surfaces of the members and their valve means.

Another object of this invention is to provide the interlocking elements of the coupling members with means for bringing the opposed faces of the members together in mutual tightly contracting relation.

A still further object of this invention is to provide auxillary valve means adapted to automatically open when the coupling members are joined together and preliminary to the opening of the main fluid passage valve means, whereby to equalize pressure in the respective joined members of the coupling valve.

The above and other objects of this invention will be understood from a reading of the following description of an embodiment thereof as shown in the accompanying drawings, in which drawings:

FIG. 3A is a further enlarged fragmentary sectional view of the pressure equalizing valve means as initially closed;

FIG. 5 is an enlarged vertical sectional view of the interlocking coupling elements of the respective receiving and coupler members as juxtaposed ready for coupling engagement; and FIG. 6 is a similar view showing said coupling elements in coupled engagement; and FIG. 7 is an external and face view of the coupling ring of the coupler member.

Similar characters of reference are employed in the above described views, to indicate corresponding parts.

Figure 3:
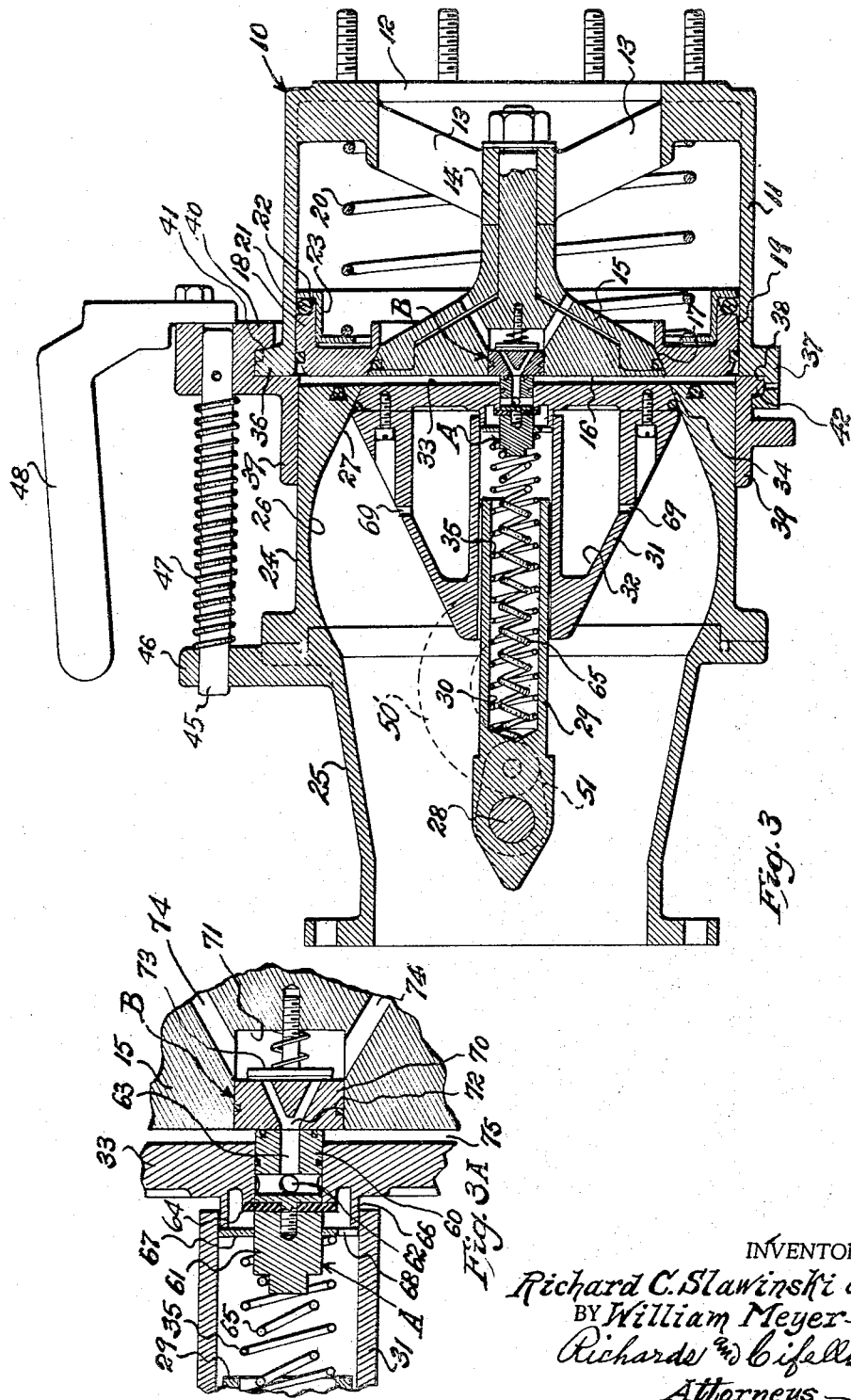
FIG. 3 is an enlarged longitudinal sectional view of the coupling valve members as coupled, but with the main fluid passage valve means closed.
Figure 4:
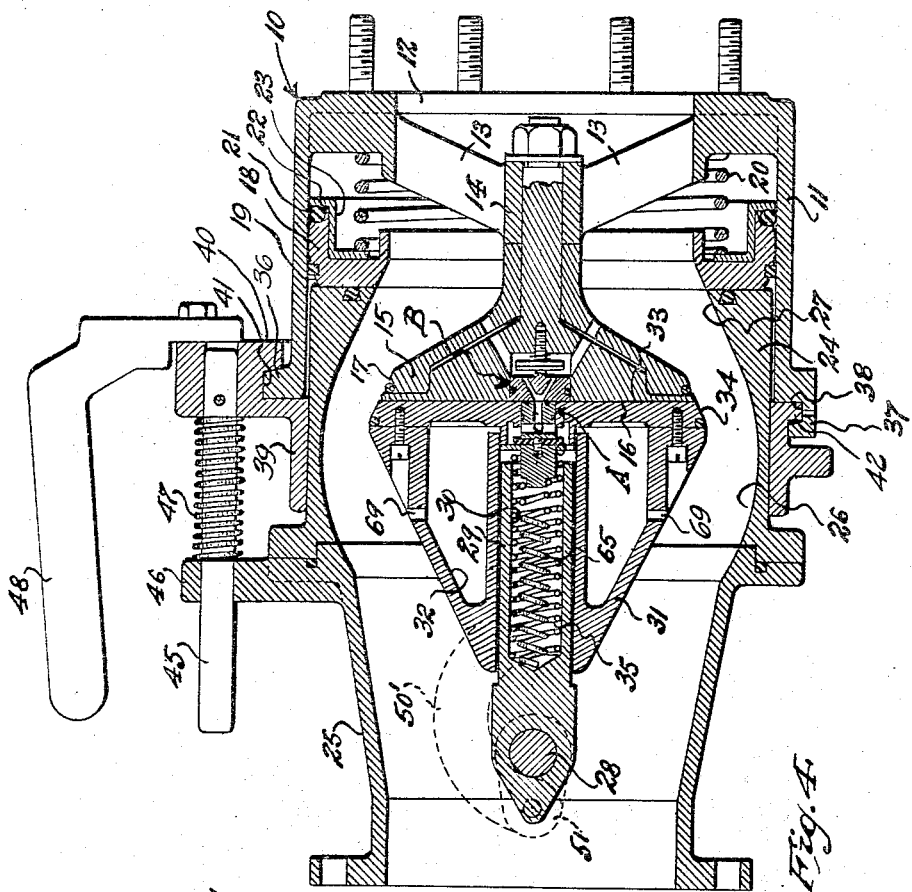
FIG. 4 is an enlarged longitudinal sectional view of the coupling valve members as coupled, and after the main fluid passage valve means is opened.

Referring to the drawings, the reference character 10 indicates the adapter or receiving member of the coupling valve. Said receiving member comprises a cylindrical, endwise open, body 11, the discharge end of which is adapted to be suitably affixed to a tank or other means to be supplied (not shown), in communication with an intake thereof. At its rearward discharge end, the outlet opening 12 of the body 11 is spanned by spider arms 13 to support an axially disposed hub 14. Supported by said hub 14 is a forwardly projecting stationary or fixed, rearwardly tapered, conical valve member 15, the front face 16 of which is disposed flush with the plane of the forward end of the body 11. Said valve member 15 is of substantially smaller diameter than is the internal diameter of the body 11, whereby to provide an annular intermediate opening. The periphery of the valve member 15 is shaped to provide a rearwardly and inwardly inclined seat 17. Opposed to said intermediate opening is an annular, axially movable valve ring 18, the internal periphery of which is shaped to normally close against the seat 17 of the stationary valve member 15. The valve ring 18 is slidably guided by the side walls of the body 11, and its external periphery 19 is transversely rounded or arched to facilitate its sliding movements relative to the walls of the body 11, without risk of binding or other impedance. When the valve ring 18 is in closed position (see FIG. 3), its front face lies flush with the front face 16 of the valve member 15. The valve ring 18 is biased to its closed position by a compression spring 20. The seating surfaces between the valve member 15 and valve ring 18 are preferably provided with compressible sealing means, as shown. Sealing means are also interposed between the valve ring 18 and the side walls of the body 11, including a compressible O-ring seal 21, which is mounted on the rearward end of said valve ring. This O-ring seal 21 is supported, with its rearward side exposed, on a rearwardly and inwardly inclined seating flange 22. Movably engaged, with the exposed rear side of the O-ring seal 21, is an annular presser plate 23, which is interposed between the compression spring 20 and said valve ring 18, when upon opening movement of the valve ring 18, the spring 20 is tensionally compressed, the thrust of the latter forces the presser plate 23 against the O-ring seal 21, whereby to move the latter against the inclined seating flange 22, and thus radially expanding the same, thereby forming it into strong sealing contact with the side walls of the receiving member body 11, when the valve ring 18 is moved to open condition (see FIG. 4).

The coupler member of the coupling valve is preferably, but not necessarily, made in two endwise open parts, which are suitably connected together in end to end relation. Said parts comprise a forward body section 24 and a rearward body section 25. The rearward body section 25 is adapted to be suitably connected to the free end of a movable delivery conduit (not shown) that leads from a source of fluid supply. The forward body section 24 is internally shaped to provide an enlarged globular chamber 26, which terminates at its forward or outer end in a forwardly and inwardly tapered seating surface 27. Journaled in and through the side walls of the rearward body section 25, to extend in transverse horizontal disposition across the longitudinal axis of the coupler member, is a rotatable shaft 28. Mounted on said shaft, within the coupler member interior is a forwardly and axially projecting valve member supporting arm 29, having an outwardly open hollow interior 30. Supported on said 29 is a rearwardly projecting and tapered conical valve member 31, having a hollow interior 32. The outer face of the front wall 33 of the valve member 31 is flush with the outer end plane of the body section 24, and is adapted to oppose the face of the valve member 15 of the receiving member 10, when, in use, the coupler member 24–25 is aligned with the receiving member 10, under which condition, the end face of body section 24 is disposed to oppose the valve ring 18 of said receiving member 10.

The periphery of the valve member 31 is shaped to provide a forwardly and inwardly inclined seat 34, to normally close against the seating surface 27 of the body section 24, when the coupler member is detached from the receiving member 10; intermediate compressible sealing means being provided, as shown. The valve member 31 is biased to closed position relative to the body section 24 by a compression spring 35, which is housed in the interior of the supporting arm 29.

The opposable ends of the coupler member 24–25 and the receiving member 10 are respectively provided with cooperative interlocking elements operative, in use, to detachably join the same together in coupled relation, at the top portion of its outer end, with an upstanding male coupling element 36 of suitable circumferential length, and at the bottom portion thereof with an outwardly offset female coupling element 37, also of suitable circumferential length, and which is provided with an upwardly open receiving channel 38.

Mounted on the outer end of the body section 24 of the coupler member is a coupling ring 39. At its top portion this coupling ring is provided with an outwardly offset, upstanding female coupling element 40 of suitable circumferential length, and having a downwardly open receiving channel 41. At its bottom portion, the coupling ring 39 is provided with a dependent male coupling element 42 of suitable circumferential length.

The outer end face of the coupling ring 39 is provided, at respective opposite sides thereof, with upwardly and outwardly inclined guide cam elements 43, which extend from a transverse mid-portion thereof to the channel 41 of the female coupling element 40. These guide cam elements serve to guide the coupling member relative to the receiving member when the former is lowered into alignment with the latter, whereby to quickly and easily engage their respective coupling elements into coupling relation, without risk of scoring or galling the meeting faces of said members.

When the coupling ring 39 is engaged with the receiving member 10, to operatively connect the coupler member 24–25 to the latter, the male coupling element 36 of said receiving member is entered in the receiving channel 41 of the female coupling element 40 of said coupling ring 39, while the male coupling element 42 of the coupling ring is entered in the receiving channel 38 of the female coupling element 37 of the receiving member. The interior surfaces of the outer walls of the respective channels of the female coupling elements 37 and 40, are downwardly and inwardly inclined to provide camming surfaces 44, operative to draw tightly together the coupler member and receiving member when the same are joined in coupled relation.

Affixed to the upstanding female coupling element 40 of coupling ring 39 is a rearwardly extending longitudinal key rod 45, the free end portion of which is slidably supported by a rearwardly spaced upstanding post 46, with which the coupler member body 24–25 is provided. This key rod 45 retains the coupling ring 39 and coupler member body 24–25 against relative rotative displacement, so as to maintain opposed alignment of the interlocking coupling elements of the coupling ring 39 and receiving member 10, when a coupling operation is carried out. Mounted around the key rod 45, between the coupling element 40 and post 45, is a compression spring 47. Also affixed to said coupling element 40, in upstanding overhanging relation to the coupler member body section 24, is a carrying handle 48.

Figure 1:
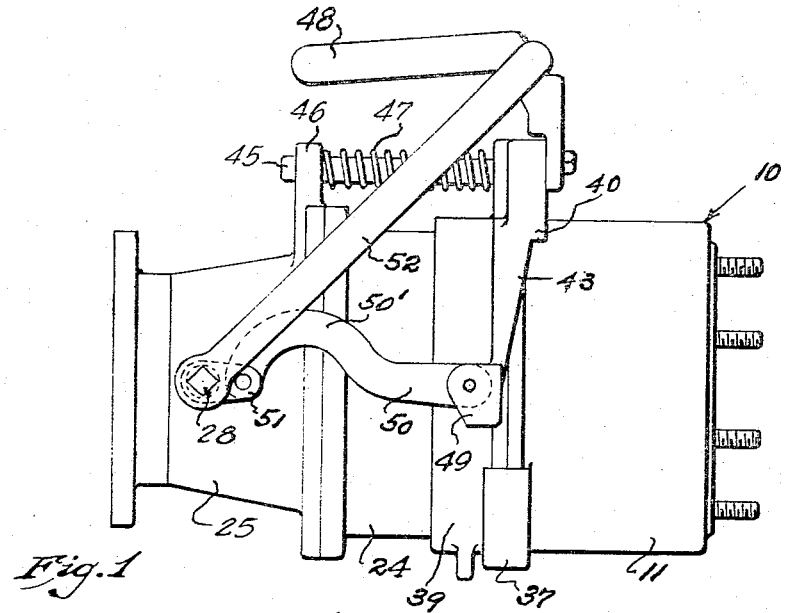
FIG. 1 is a side elevational view of the coupling valve members as coupled, but with the main fluid passage valve means closed.
Figure 2:
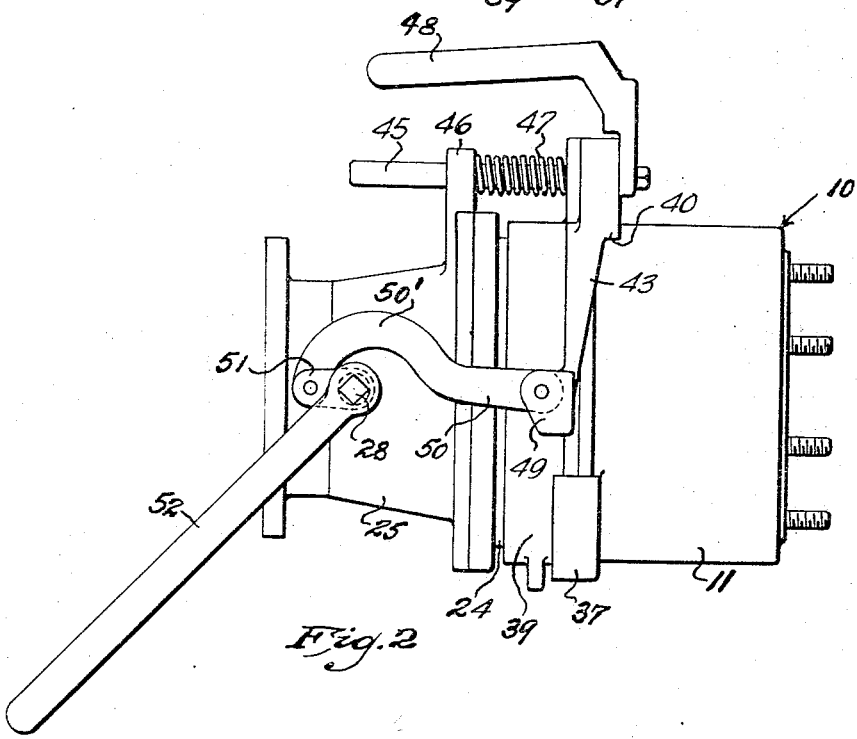
FIG. 2 is a similar side elevational view of the coupling valve as coupled and after the main fluid passage valve means is opened.

Means is provided for manually moving the coupler member body 24–25 axially outward relative to the coupling ring 39, after the latter is operatively joined to the receiving member 10. To this end, formed in connection with the medial portion of the coupling ring 39, at least at one side thereof and preferably at both sides thereof, is an external bearing ear 49, to which is pivotally connected a rearwardly extending link 50. Affixed to one or each externally projecting end portion of the shaft 28, which is journaled across the coupler member body section 25, is a crank arm 51 to which a rearward end of a connecting link 50 is pivotally attached. The rearward end of said connecting link 50 terminates in an arched portion 50; that is adapted, at a certain operative position, to overpass the shaft 28 (see FIG. 2). Affixed to an end of the shaft 28 is a hard lever 52, by means of which the shaft and crank arm 51 are rotated to effect coupling valve opening and closing movements. When the hand lever 52 is in normal initial upswing or raised condition, the valve member 31 is closed relative to the body section 24 (see FIG. 3).

To join the coupler member 24–25 with the receiving member 10, in operative coupled relation thereto, the former, as carried and manipulated by the handle 48, is lifted and disposed above the latter with the opposed faces thereof substantially parallel (see FIG. 5). The coupler member is thereupon lowered relative to the receiving member, whereby to bring the cooperative interlocking elements of the coupling ring 39 and receiving member 10 into engagement, thereby coupling coupler member to the latter, the valve member 31 and valve ring 18 remaining closed (see FIG. 3). This having been done, the valve means of the joined members can be opened to fluid passage by swinging downward the hand lever 52. By this operation, the crank arm or arms 51 are rotated relative to the link or links 50, thereby exerting draft upon the shaft 28 and thus moving forward the coupler member 24–25 relative to the coupling ring 39, whereby to abut the yieldable spring biased valve member 31 against the stationary valve member 15 of the receiving member 10, thereby centering these valve members in the globular chamber 26, while the axially advanced coupler member 24–25 moves inwardly the valve ring 18 to open the same relative to the valve member 15, thus permitting the full streamline flow of fluid through the coupling valve (see FIG. 4).

By returning the handle lever 52 to normal initial upswing position, the valves of the coupling valve are caused to resume normal closed condition, whereupon the coupler member can be lifted away from the receiver member, so as to be detached therefrom.

As thus far described, the coupling valve is well adapted for many uses to control fluid delivery flow. In some cases, however, it is desirable to provide auxiliary valve means which is adapted to automatically open when the coupling valve members are joined together, and preliminary to opening of the main fluid passages thereof, whereby to equalize fluid pressure in the joined members. For this purpose, a movable auxiliary valve element A is axially mounted in the valve member 31 of the coupler member, and a cooperative stationary auxiliary valve element B is axially mounted in the valve member 15 of the receiving member.

The auxiliary valve element A comprises an outer end portion 60 that is movable in and through the front wall 33 of valve member 31, and an inner end portion 61 that extends into the interior of said valve member 31. The outer end portion 60 is provided with radial intake ports 62 and an axial outlet port 63. Intermediate said end portions 60 and 61 is a radial sealing member 64. When the valve element is outwardly moved to closed position (see FIG. 3A), as biased thereto by a compression spring 65, that is housed in the interior 30 of the arm 29 which supports the valve member 31, the intake ports 62 are closed by the surrounding front wall 33 of the valve member 31, and the sealing member 64 seals against the inner side of said front wall. When the valve element A is thus closed, its outer extremity projects a predetermined distance exteriorly of the outer face plane of the front wall 33 of valve member 31.

When the auxiliary valve means is included in the coupling valve structure, the front wall 33 of valve member 31 is modified to provide an interior hollow hub 66 which is concentric to and spaced from the inner end portion 61 of valve element A, and said inner end portion 61 is slidably supported by a transverse presser disc 67, that bears against the hub 66, and which is provided with a fluid passage opening 68. Said presser disc receives and transmits the thrust of spring 35 by which the main valve member 31 of the coupler member is biased to its closed position. The main valve member 31 is provided with one or more fluid admission ports 69 leading into its interior from the chamber 26 of the coupler member. It will be understood that fluid will pass from the interior of valve member 31 around loosely fitting parts to the intake of the auxiliary valve means.

The auxiliary valve element B comprises a body member 70 which is mounted in the outer end portion of an axially disposed chamber 71, with which the valve member 15 of the receiving member 10 is provided. The outer end face of said body member 70 lies flush to the outer face 16 of valve member 15, and in opposition to the auxiliary valve element A when the members of the coupling valve are joined in coupling relation. Said body member 70 is provided with discharge port means 72, the same being normally closed by a spring biased check valve 73 that is housed in the inner end interior of the chamber 71, behind the body member 70. Leading from the chamber 71, through the main valve 15 to the interior of the receiving member 10, are one or more fluid passage ports 74.

When the auxiliary valve means is included in the coupling valve structure, by somewhat increasing the length of the connecting link or links 50 of the coupler member, the coupling ring 39 is so positioned, relative to the outer end of the body section 24 of the coupler member, that the outer face of the former is outwardly spaced from the end face of the latter, whereby to form an initial intervening space 75 to accommodate the outwardly projecting portion of the auxiliary valve element A, whereby the latter will not interfere with coupling movements of the coupling ring 39 relative to the receiving member 10.

Figure 4A:
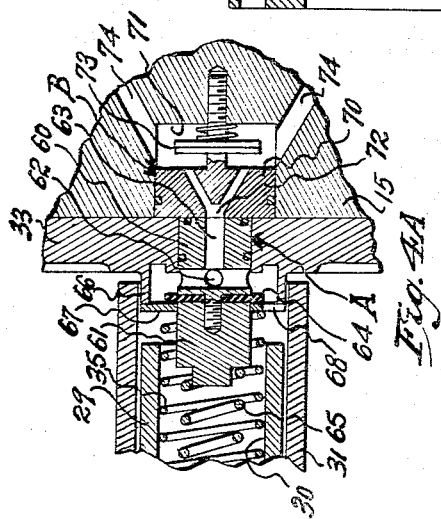
FIG. 4A is a further enlarged fragmentary sectional view of the pressure equalizing valve as opened.

In the operation of the coupling valve as equipped with the described auxiliary valve means, after the coupler member and receiving member are joined in coupled relation, the hand lever 52 is swung down to open the same to fluid passage, as already above described. The initial downward movement of the hand lever (about 10° thereof) will first advance the coupler member 24–25 until its end and the main valve member 31 respectively abut the valve ring 18 and valve member 15 of receiving member 10. As this occurs, the outer end of the auxiliary valve element A will engage the auxiliary valve element B, so that the former will be pressed back, against the tension of its biasing spring 65, to open position (see FIG. 4A). When thus opened, the auxiliary valve means will pass fluid from the interior of the coupler member to the interior of the receiving member, the check valve 73 yielding to such flow. It will be obvious that, due to this, fluid pressure in the coupled members of the coupling valve will be equalized. Therefore, further downward movement of the hand lever 52 will cause the main valve means of the coupling valve to open for fluid passage delivery.

We claim:

1. A coupling valve comprising a stationary receiving member adapted to be affixed to a tank to be supplied in communication therewith and a portable coupler member adapted to be affixed to a movable conduit leading from a source of fluid supply; the receiving member comprising an endwise open body, a stationary main valve member, means to support said valve member at the receiving end of the body with its outer face disposed in the plane of said end, the periphery of said valve member being spaced from the walls of the body and a yieldable valve ring slidably mounted in the body to normally close against the periphery of said main valve member; the coupler member comprising an endwise open body terminating at its discharge end in an inwardly inclined seating surface, a yieldable valve member axially disposed within the discharge end portion of said body to normally close against its seating surface, a coupling ring mounted on the discharge end portion of said body relative to which said body is slidably movable, and means to prevent rotative displacement of the coupling ring relative to said body; said receiving member body and coupling ring having cooperative interengageable coupling elements operative to attach the coupler member to the receiving member in coupled relation thereto which comprise a male coupling element upstanding from the upper outer end portion of the receiving member, a female coupling element exteriorly offset from the upper outer face portion of the coupling ring and having a downwardly open channel to receive said upper male coupling element of the receiving member, a male coupling element dependent from the lower outer end portion of the coupling ring, a female coupling element exteriorly offset from the lower face portion of the receiving member and having an upwardly open channel to receive said lower male coupling element of the coupling ring; and manually operative means for moving the coupler member body so as to pass its discharge end portion through the coupling ring and into the receiving member, whereby to open the valve ring of the latter after the coupler member is coupled to the receiving member, and to cause the valve member of the coupler member, by abutment against the stationary main valve member of the receiving member, to yieldable move to open fluid passing relation to the interior of the coupler member.

2. A coupling valve according to claim 1, wherein the coupling elements operative to couple the coupler member to the receiving member comprise a male coupling element upstanding from the upper outer end portion of the receiving member, a female coupling element exteriorly offset from the upper outer face portion of the coupling ring and having a downwardly open channel to receive said upper male coupling element of the receiving member, a male coupling element dependent from the lower outer end portion of the coupling ring, and the outer walls of the channels of the respective female coupling elements of the coupling ring and receiving member being provided with interior inwardly inclined camming surfaces engageable with said respective male coupling elements, whereby to draw together the meeting end surfaces of the coupler member and receiving member when said members are engaged in coupled relation.

3. A coupling valve according to claim 1, wherein the coupling elements operative to couple the coupler member to the receiving member comprise a male coupling element upstanding from the upper outer end portion of the receiving member, a female coupling element exteriorly offset from the upper outer face portion of the coupling ring and having a downwardly open channel to receive said upper male coupling element of the receiving member, a male coupling element dependent from the lower outer end portion of the coupling ring, and the coupling ring having upwardly and outwardly inclined guide cam element, projecting from side portions of its face, the same being operative to guide the male and female coupling elements into engaged relation when the coupler member is poised above the receiving member and then lowered into coupled engagement with the latter.

4. A coupling valve according to claim 1, wherein the coupling elements operative to couple the coupler member to the receiving member comprise a male coupling element upstanding from the upper outer end portion of the receiving member, a female coupling element exteriorly offset from the upper outer face portion of the coupling ring and having a downwardly open channel to receive said upper male coupling element of the receiving member, a male coupling element dependent from the lower outer end portion of the coupling ring, a female coupling element exteriorly offset from the lower face portion of the receiving member and having an upwardly open channel to receive said lower male coupling element of the coupling ring, and the outer walls of the channels of the respective female coupling elements of the coupling ring and receiving member being provided with interior inwardly inclined camming surfaces engageable with said respective male coupling elements, whereby to draw together the meeting end surfaces of the coupler member and receiving member when said members are engaged in coupled relation and the coupling ring having upwardly and outwardly inclined guide cam elements, projecting from side portions of its face, the same being operative to guide the male and female coupling elements into engaged relation when the coupler member is poised above the receiving member and then lowered into coupled engagement with the latter.

5. A coupling valve according to claim 1, wherein the coupler member is provided, at its upper side, with an external overhanging carrying handle to facilitate manipulation thereof during coupling and uncoupling operations.

6. A coupling valve according to claim 1, wherein the manually operable means for opening the connected coupler member and receiving member to fluid passage comprises a horizontal diametric shaft journaled in and through the walls of and across the rear end portion of the coupler member body, an axially disposed forwardly extending supporting arm upon which the yieldable valve of the coupler member is slidably mounted, crank arm means affixed to said shaft externally of the coupler member body, link means interconnected between the coupling ring and crank arm means, and a hand lever affixed to said shaft for rotating the same and said crank arm means.

7. A coupling valve according to claim 1, wherein the valve ring of the receiving member is shaped to provide its external periphery with a transversely arched surface to bear against the walls of the receiving member, said receiving member including a compression spring to yieldably thrust the sealing ring to its closed position.

8. A coupling valve according to claim 1, wherein the valve ring of the receiving member is provided with sealing means between the same and the walls of said receiving member, said sealing means including a rearwardly exposed O-ring seal, the rear end of the valve ring having an indented annular channel bottomed by an outwardly inclined seating flange to support the O-ring seal, a presser plate to bear against the seated O-ring seal, and the receiving member including a compression spring to yieldably thrust the valve ring to closed position, said spring, under the valve ring opening tension, urging the presser plate to O-ring seal expanding pressure, whereby to establish strong sealing effect between said valve ring and the walls of the receiving member when the former is open.

9. A coupling valve according to claim 1, wherein the main valve of the coupler member and the receiving member are provided with auxiliary valve means intermediate the same, said auxiliary valve means being operative to open between the coupler member and receiving member when the latter are connected in coupled relation, whereby to equalize fluid pressure between said members prior to manual opening of the coupling valve to fluid passage.

10. In a coupling valve according to claim 1, wherein the valve of the coupler member is of hollow formation having fluid admission means opening thereinto from the interior of the coupler member, auxiliary valve means intermediate the main valves of the coupler member and the receiving member, said auxiliary valve means comprising a valve element slidably movable relative to the front wall of the main valve of the coupler member, the same having fluid intake and discharge ports, said movable valve element being biased to intake port closed relation to said front wall of the main valve of the coupler member when the latter is closed, in which relation a forward end portion of said valve element projects outwardly from said main valve front wall, the main valve of the receiving member having a stationary auxiliary valve body to cooperate with said movable auxiliary valve element, the same being provided with fluid passage means to lead from the movable auxiliary valve element into the interior of the receiving member, and a check valve means to close said passage means when the coupler member and receiving member are disconnected, said movable auxiliary valve element being adapted to be pressed back to its intake port open condition when the main valves of the coupler member and receiving member are abutted during the coupling operation of said members and prior to manual opening of the coupling valve to fluid passage.

References Cited

UNITED STATES PATENTS

| | | | |
|---|---|---|---|
| 559,911 | 5/1896 | Sheridan | 285—326 |
| 2,729,471 | 1/1956 | Fraser | 137—599.2 |
| 3,216,744 | 11/1965 | Elbogen | 251—89.5 |

FOREIGN PATENTS

| | | |
|---|---|---|
| 221,895 | 6/1959 | Australia. |

WILLIAM F. O'DEA, *Primary Examiner.*

H. COHN, *Assistant Examiner.*